Dec. 29, 1964  H. E. EIRHART, JR  3,163,450
QUICK-DETACHABLE HYDRAULIC COUPLING
Filed Sept. 14, 1962
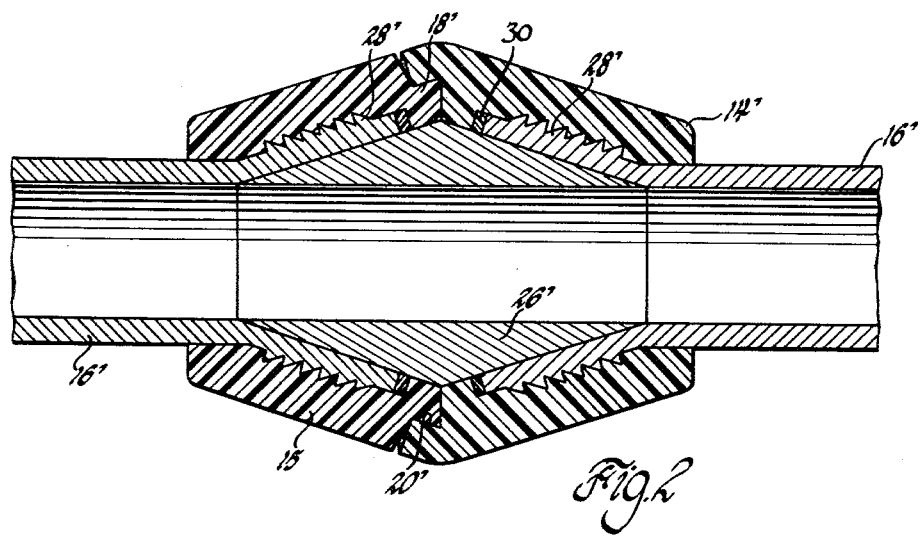
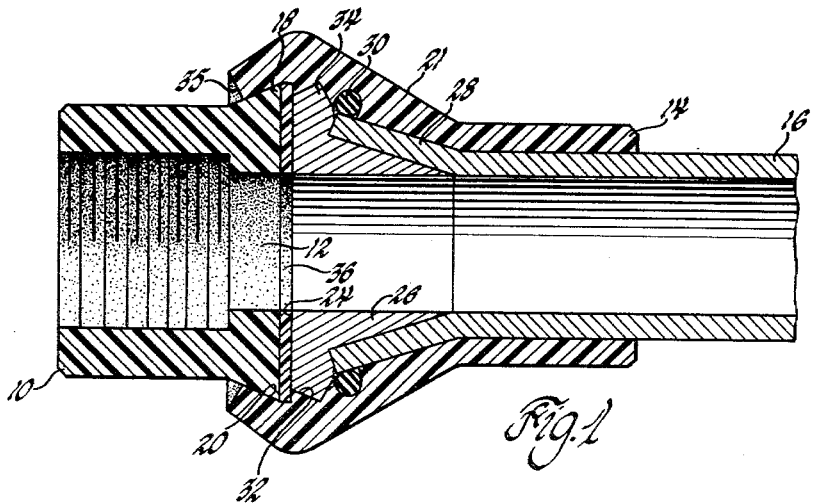
INVENTOR.
Harry E. Eirhart Jr.
BY
Wilson, Settle & Craig
ATTORNEYS

United States Patent Office 3,163,450
Patented Dec. 29, 1964

3,163,450
QUICK-DETACHABLE HYDRAULIC COUPLING
Harry E. Eirhart, Jr., 9951 Kinloch, Detroit 39, Mich.
Filed Sept. 14, 1962, Ser. No. 223,668
1 Claim. (Cl. 285—238)

This invention relates to quick-detachable couplings such as are used for easily joining and separating fluid conduits or detachably connecting a conduit to a fluid container to which a quick-detachable fitting may be permanently secured.

Many forms of quick-detachable couplings for conduits have been proposed. Examples are shown in the patents to Arnold 1,543,356, Corcoran 2,784,987 and Leadbetter 2,831,711. While such couplings may operate satisfactorily within their inherent limitations, each which has come to my attention has disadvantages which I propose to overcome. Some are expensive to make and complicated to assemble and operate, others are not positive in their operation or require tools or auxiliary devices to engage them or release them.

It is one of the objects of my invention to provide a quick-detachable couplings for fluid conduits such as hoses, tubing or the like, which coupling can be used to connect a pair of conduits by a single simple pushing movement of one into the other. This automatically locks the conduits together with a sealing connection and holds them with sufficient force to resist separation under the influence of low or medium pressures in the conduits.

Another object of the invention is to provide an improved form of quick-detachable coupling which can be easily and economically manufactured and especially one which can be molded of plastic material.

Another object of the invention is to provide a quick-detachable coupling made of elastic material in which the inherent elasticity of the material normally holds the coupling in a shape and size which provides a satisfactory lock, which however can readily be unlocked to disassemble the coupling by the application of moderate force and without the use of tools or auxiliary devices.

Other objects of the invention will appear in the following description and appended claims, and by referring to the accompanying drawings forming part of this specification, wherein the same reference character always designates the same part wherever it occurs.

In the drawings:
FIGURE 1 is a longitudinal section of one form of improved coupling embodying the invention, and
FIGURE 2 is a similar longitudinal section of a modified form of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, 10 designates a member or male coupling having a fluid passage 12 and to which a female coupling 14 is to be attached. The member 10 represents or may be a conduit, or a fitting to be attached to a conduit, or a permanently attached portion of any suitable container for fluid to which a second conduit 16 is to be connected. In FIGURE 1 the passage 12 is provided with internal screw threads for attachment to any suitable conduit or container. The outside of one end of the member 10 is flared or otherwise formed into ridge means 18 which forms a locking ridge for attaching to the coupling 14. The fitting or member 10 is usually circular and the locking ridge means 18 can conveniently be formed as a flared or conical surface on the outside of the member 10. It is not essential that this ridge be circumferentially continuous about the member 10 but it may be formed as a series of ridges which define a locking circle.

The coupling 14 is tubular to receive the conduit 16. It is provided at its left hand end with a locking means which cooperates with the locking ridge means 18. This locking means on the coupling 14 preferably takes the form of a bell 21 having an internal flaring or sloping or conical surface 20 which is snapped over the locking ridge 18. This holds the two parts together and urges the member 10 toward the body of the coupling 14 and against a sealing surface therein. This is accomplished by making the smallest diameter of the conical surface 20, which is at the left end of the coupling 14 as FIGURE 1 is seen, smaller than the largest diameter of the locking ridge 18. In order to accommodate the smaller diameter snapping over the larger diameter the member 14 is elastic and is preferably formed of the acetyl resin marketed by E. I. Du Pont de Nemours & Company as Delrin. This provides a coupling 14 of self-sustaining form and dimension which is essentially rigid to light touch or pressure but can be stretched or deformed by a moderate force so as to snap over the ridge 18. If the ridge means 18 is an interrupted series of ridges or projections, the bell 21 can be deformed enough to snap over the ridge by being radially distorted or forced out of round so that the normally smaller diameter can pass over the ridges without stretching. However, if the ridge 18 is a continuous surface, it will be necessary to stretch the end of the bell 21 circumferentially enough to pass over a larger diameter. Either kind of distortion is called radial distortion. I have found that Delrin plastic material can readily be molded to provide a coupling as shown having sufficient stretch to snap over a projection such as 18. After passing over the projection 18 the material relaxes under its inherent elasticity and assumes the position shown in FIGURE 1. This is the position of the material in repose in which the left end of the flaring surface 20 is smaller in diameter than the projection 18 over which it has passed. The inherent contraction or elastic restoration of size and shape of the bell 21 exerts a camming action on the ridge 18 and constantly urges it toward the right and against the sealing surface in the coupling 14.

Preferably this sealing surface is a radial surface 24 on the end of a hollow conical wedge 26. The conduit 16 is secured to the fitting 14 by a flared end 28 which fits on the inside of the bell 21, and the wedge 26 which forces the end 28 into sealing relationship with the inner surface of the bell. If desired this sealing may be made more secure by an elastomeric O-ring 30 which may be placed in a suitable groove either in the surface of the bell or in the surface of the flared tube 28.

The wedge may be held in the flared tube by a self-sustaining friction taper of the proper known angle. But preferably the wedge 26 is held permanently in the end of the tube 16 and the tube 16 is held permanently in the fitting 14 by the following locking mechanism. The bell 21 is formed with a second conical locking surface 32 and the end of the wedge is formed into a locking ridge 34 similar to the locking ridge 18. The minimum diameter of the second locking surface 32 is less than the maximum diameter of the locking ridge 34 so that the wedge can be snapped into place and be held by the inherent elasticity of the bell as explained in connection with the locking ridge 18 and locking surface 20. Thus the wedge permanently holds the flared end 28 in sealing relationship with the bell and the bell holds the wedge in place by the locking means just described.

It is contemplated that this device will be used for quick-detachable couplings in conduits carrying relatively low pressure for example gasoline from a fuel pump to the carburetor of an engine. In this case the tube 16 can readily be connected to the member 10 by simply pushing the bell 21 over the end of the locking ridge 18, the end of the tube being sufficiently flared as at 35 to give the necessary stretching action to the bell. Then the resilient restoration to its shape in repose will hold the parts in place as above described.

If the end surface 24 of the wedge and the fitting 10 do not form a tight seal, or if the dimensional variations in mass production do not always effect a sealing action, the seal may be perfected by inserting a gasket, O-ring or other resilient seal 36 between the member 10 and the end of the wedge 26. The gasket will resiliently urge the locking ridge 18 against the locking surface 20 and urge the wedge 26 into the flared end 28 and the flare 28 into sealing relation with the coupling 14.

The coupling is released by applying force transversely to the axis of the fitting for example, downward as FIGURE 1 is seen on the end of the coupling 14. This will stretch the bell 21 to snap over the locking ridge 18 and release the coupling.

In the form of the invention shown in FIGURE 2 the device is applied to connect two lengths of similar conduit. In this case there is a pair of coupling members 14' and 15. The member 14' is formed with a flared or tapering conical locking surface 20' and the coupling 15 is formed with a locking ridge 18'. Each of the couplings 14' and 15 is secured to a tube 16' flared after the manner shown in FIGURE 1 but, differently secured to the coupling members, that is by any suitable means such as the known internal serrations indicated in the drawing. A double conical wedge 26' is inserted in both flare ends 28' and the flare ends are urged axially and radially into sealing engagement with the wedge by the axial thrust developed in the shrinking or elastic restoration of the locking surface 20' over the locking ridge means 18'. If the contact between the wedge and the tubes does not provide a good enough seal, the wedge is sealed to both tubes by elastomeric O-rings 30 placed between the flared ends of the tubes 16' and shoulders in the fittings 14' and 15, as shown in the drawings. Alternatively, the rings 30 can be placed in grooves in the wedge.

Having thus described my invention, I claim:

A quick-detachable coupling device comprising in combination a member having a fluid passage therein, locking ridge means on the outside of the member defining a locking circle, a hollow elastic coupling having an open end surrounded by a continuous hollow generally circular locking surface inside the coupling adapted to expand and contract circumferentially, the locking surface when the elastic coupling is in repose sloping axially of the coupling and having a minimum diameter less than the maximum diameter of the locking circle, said minimum diameter being located on the same side of the maximum diameter of the locking surface as the open end so that the elastic coupling can be stretched to snap over the locking ridge means, a hollow flared surface on the inside of the coupling, a tube having an external flared surface fitting the first flared surface, a hollow circular wedge inside the tube holding the tube in sealing relation to the first flared surface, and means for holding the wedge in the tube, said last mentioned means including second locking ridge means defining a second locking circle on the outside of the wedge and a second locking surface on the inside of the coupling, the second locking surface when the elastic coupling is in repose sloping axially of the coupling and having a minimum diameter less than the maximum diameter of the second locking circle, and the minimum diameter of the second locking surface being located between the maximum diameter of the second locking surface and the open end so that the second locking surface can be snapped over the wedge and resiliently urges the wedge into the tube.

References Cited by the Examiner

UNITED STATES PATENTS

| | | | |
|---|---|---|---|
| 2,463,196 | 3/49 | Parker | 285—334.5 |
| 2,889,089 | 6/59 | Herrick | 285—423 |
| 2,907,973 | 10/59 | Stevens. | |
| 2,947,071 | 8/60 | Marchant | 285—260 |
| 2,999,700 | 9/61 | Smith | 285—334.2 |
| 3,119,411 | 1/64 | Bock | 285—260 |

FOREIGN PATENTS

| | | |
|---|---|---|
| 810,884 | 3/59 | Great Britain. |
| 1,141,975 | 9/57 | France. |

CARL W. TOMLIN, *Primary Examiner.*

THOMAS F. CALLAGHAN, *Examiner.*